(12) United States Patent
Gunhalkar et al.

(10) Patent No.: US 9,497,328 B2
(45) Date of Patent: *Nov. 15, 2016

(54) CONFERENCE CALL ALERTS

(71) Applicant: International Business Machines Corporation, Armonk, NY (US)

(72) Inventors: Krupa S. Gunhalkar, Bangalore (IN); Gopi Janakiraman, Bangalore (IN); Srinivas Mandava, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,683

(22) Filed: Feb. 17, 2016

(65) Prior Publication Data

US 2016/0269552 A1 Sep. 15, 2016

Related U.S. Application Data

(63) Continuation of application No. 14/645,799, filed on Mar. 12, 2015.

(51) Int. Cl.
*H04M 3/42* (2006.01)
*H04L 12/18* (2006.01)
*H04M 3/56* (2006.01)

(52) U.S. Cl.
CPC ............ *H04M 3/56* (2013.01); *H04L 12/1822* (2013.01); *H04M 3/42* (2013.01); *H04M 2203/5009* (2013.01); *H04M 2203/5018* (2013.01); *H04M 2203/5081* (2013.01)

(58) Field of Classification Search
CPC ............ H04M 2203/5081; H04M 2203/5018; H04M 2203/5009; H04L 12/1822
See application file for complete search history.

(56) References Cited

U.S. PATENT DOCUMENTS

| 8,542,812 | B2 | 9/2013 | Danielsen | |
|---|---|---|---|---|
| 8,718,253 | B2 | 5/2014 | Sharland et al. | |
| 2006/0010200 | A1* | 1/2006 | Mousseau | H04L 12/1813 709/204 |
| 2011/0275418 | A1 | 11/2011 | Forstall et al. | |
| 2014/0122600 | A1* | 5/2014 | Kim | H04L 65/4038 709/204 |
| 2014/0161244 | A1* | 6/2014 | Jones | H04M 3/56 379/202.01 |

OTHER PUBLICATIONS

List of IBM Patents or Patent Applications Treated as Related, dated May 16, 2016, 2 pages.
U.S. Appl. No. 14/645,799, filed Mar. 12, 2015, Entitled "Conference Call Alerts", 24 pages.

* cited by examiner

*Primary Examiner* — Omer S Mian
(74) *Attorney, Agent, or Firm* — Olivia R. Scheuer

(57) ABSTRACT

Conference call alerting is provided. A first device of a plurality of telecommunications devices initiates a telecommunications link between the first device and a second device of the plurality of telecommunications devices. The first device receives an interaction that includes a communications address of a third device of the plurality of telecommunications devices. The telecommunications link is modified to include the third device. In response to the third device joining the telecommunications link, the first device issues an alert to the second device and the third device, wherein the alert indicates that the third device has joined the telecommunications link.

1 Claim, 4 Drawing Sheets

CONFERENCE CALL ALERTS

BACKGROUND OF THE INVENTION

The present invention relates generally to the field of telecommunications and, more particularly, to conference call alerts.

A conference call is a telephone call in which the calling party wishes to have more than one called party listen in to the audio portion of the call. The conference calls may be designed to allow the called party to participate during the call, or the call may be set up so that the called party merely listens into the call and cannot speak. It is sometimes called ATC (Audio Tele-Conference).

Conference calls can be designed so that the calling party calls the other participants and adds them to the call; however, participants are usually able to call into the conference call themselves by dialing a telephone number that connects to a "conference bridge" (a specialized type of equipment that links telephone lines).

Companies commonly use a specialized service provider who maintains the conference bridge, or who provides the phone numbers and PIN codes that participants dial to access the meeting or conference call.

The more limited three-way calling is available (usually at an extra charge) on mobile, home, or office phone lines. For a three-way call, the first called party is dialed. Then the hook flash button (or recall button) is pressed and the other called party's phone number is dialed. While it is ringing, flash/recall is pressed again to connect the three people together. This option allows callers to add a second outgoing call to an already connected call.

Short Message Service (SMS) is a text messaging service component of phone, Web, or mobile communication systems. It uses standardized communications protocols to allow fixed line or mobile phone devices to exchange short text messages.

SUMMARY

According to one embodiment of the present invention, a method for conference call alerts is provided. The method includes initiating, by a first device of a plurality of telecommunications devices, a telecommunications link between the first device and a second device of the plurality of telecommunications devices; receiving, by the first device, an interaction that includes a communications address of a third device of the plurality of telecommunications devices; modifying the telecommunications link to include the third device; in response to the third device joining the telecommunications link, issuing, by the first device, an alert to the second device and the third device, wherein the alert indicates that the third device has joined the telecommunications link.

According to another embodiment of the present invention, a computer program product for conference call alerts is provided. The computer program product comprises a computer readable storage medium and program instructions stored on the computer readable storage medium. The program instructions include program instructions to initiate a telecommunications link between a first device of a plurality of telecommunications devices and a second device of the plurality of telecommunications devices; program instructions to receive an interaction that includes a communications address of a third device of the plurality of telecommunications devices; program instructions to modify the telecommunications link to include the third device; program instructions to issue an alert from the first device to the second device and the third device in response to the third device joining the telecommunications link, wherein the alert indicates that the third device has joined the telecommunications link.

According to another embodiment of the present invention, a computer system for conference call alerts is provided. The computer system includes one or more computer processors, one or more computer readable storage media, and program instructions stored on the computer readable storage media for execution by at least one of the one or more processors. The program instructions include program instructions to initiate a telecommunications link between a first device of a plurality of telecommunications devices and a second device of the plurality of telecommunications devices; program instructions to receive an interaction that includes a communications address of a third device of the plurality of telecommunications devices; program instructions to modify the telecommunications link to include the third device; program instructions to issue an alert from the first device to the second device and the third device in response to the third device joining the telecommunications link, wherein the alert indicates that the third device has joined the telecommunications link.

DETAILED DESCRIPTION

Embodiments of the present invention recognize that individuals can join a conference call by calling a telephone number of a conference service, in which case the callers are connected by a conference bridge. Further, three-way calling is an example of establishing a conference call without a conference bridge. However, callers may be joined into a three-way call without their knowledge or consent.

Embodiments of the present invention provide for conference calling with alerts. In a three-way calling environment, conference calls are initiated by a caller using the caller's telephone. Embodiments of the present invention provide for issuing alerts to one or more callers on a conference line in response to a new caller joining the conference line or an existing caller leaving the conference line. Such an alert may identify the new caller or existing caller.

Figure 1:
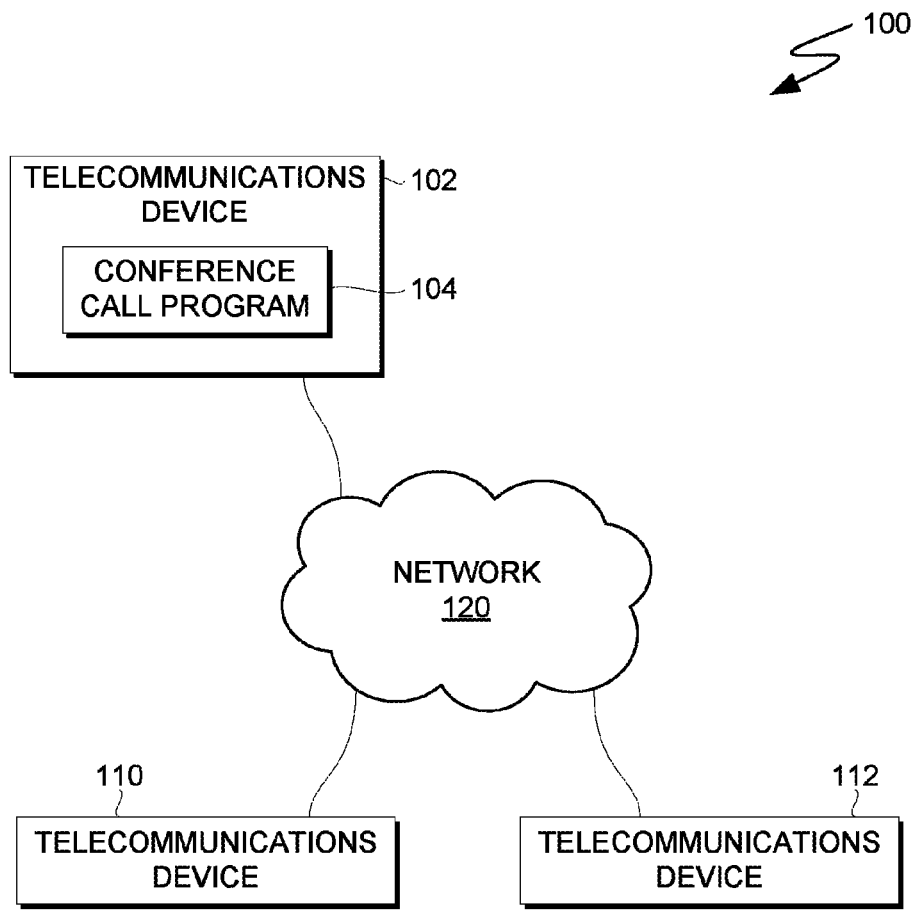
FIG. 1 is a functional block diagram illustrating a computing environment, in accordance with an embodiment of the present invention.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes telecommunications device 102, telecommunications device 110, and telecommunications device 112, which are connected over network 120. Telecommunications device 102 includes conference call program 104.

In various embodiments, telecommunications device 102 is a computing device that can be a standalone device, a server, a laptop computer, a tablet computer, a netbook computer, a personal computer (PC), or a desktop computer. In one embodiment, telecommunications device 102 is a smartphone or cellular phone. In various embodiments, each of telecommunications device 110 and telecommunications device 112 is a telephone, smartphone, cellular phone, or a computing device with telephonic capabilities. In another embodiment, telecommunications device 102 represents a computing system utilizing clustered computers and components to act as a single pool of seamless resources. In general, telecommunications device 102 can be any computing device or a combination of devices with access to telecommunications device 110 and telecommunications device 112, and capable of executing conference call program 104. Telecommunications device 102 may include internal and external hardware components, as depicted and described in further detail with respect to FIG. 4.

In this exemplary embodiment, conference call program 104 is stored on telecommunications device 102. In other embodiments, conference call program 104 may reside on another computing device, provided that conference call program 104 can access and is accessible by telecommunications device 102. In yet other embodiments, conference call program 104 may be stored externally and accessed through a communication network, such as network 120.

Network 120 can be, for example, a local area network (LAN), a wide area network (WAN) such as the Internet, or a combination of the two, and may include wired, wireless, fiber optic or any other connection known in the art. In one embodiment, network 120 includes one or more cellular network connections, voice-over-internet-protocol connections, or telephonic network connections. In general, network 120 can be any combination of connections and protocols that will support communications between telecommunications device 102, telecommunications device 110, and telecommunications device 112, in accordance with a desired embodiment of the present invention.

Conference call program 104 operates to issue conference call alerts. In one embodiment, conference call program 104 issues an alert to one or more devices of callers who are members of a conference call. In one embodiment, conference call program 104 issues an alert in response to a caller joining a conference call. For example, for a conference call initiated by a first caller, conference call program 104 issues an alert to a second caller and a third caller in response to the third caller joining the conference call. In another embodiment, conference call program 104 issues an alert in response to a caller leaving a conference call. For example, for a conference call initiated by a first caller, conference call program 104 issues an alert to a second caller and a third caller in response to the second caller leaving the conference call.

Figure 2:
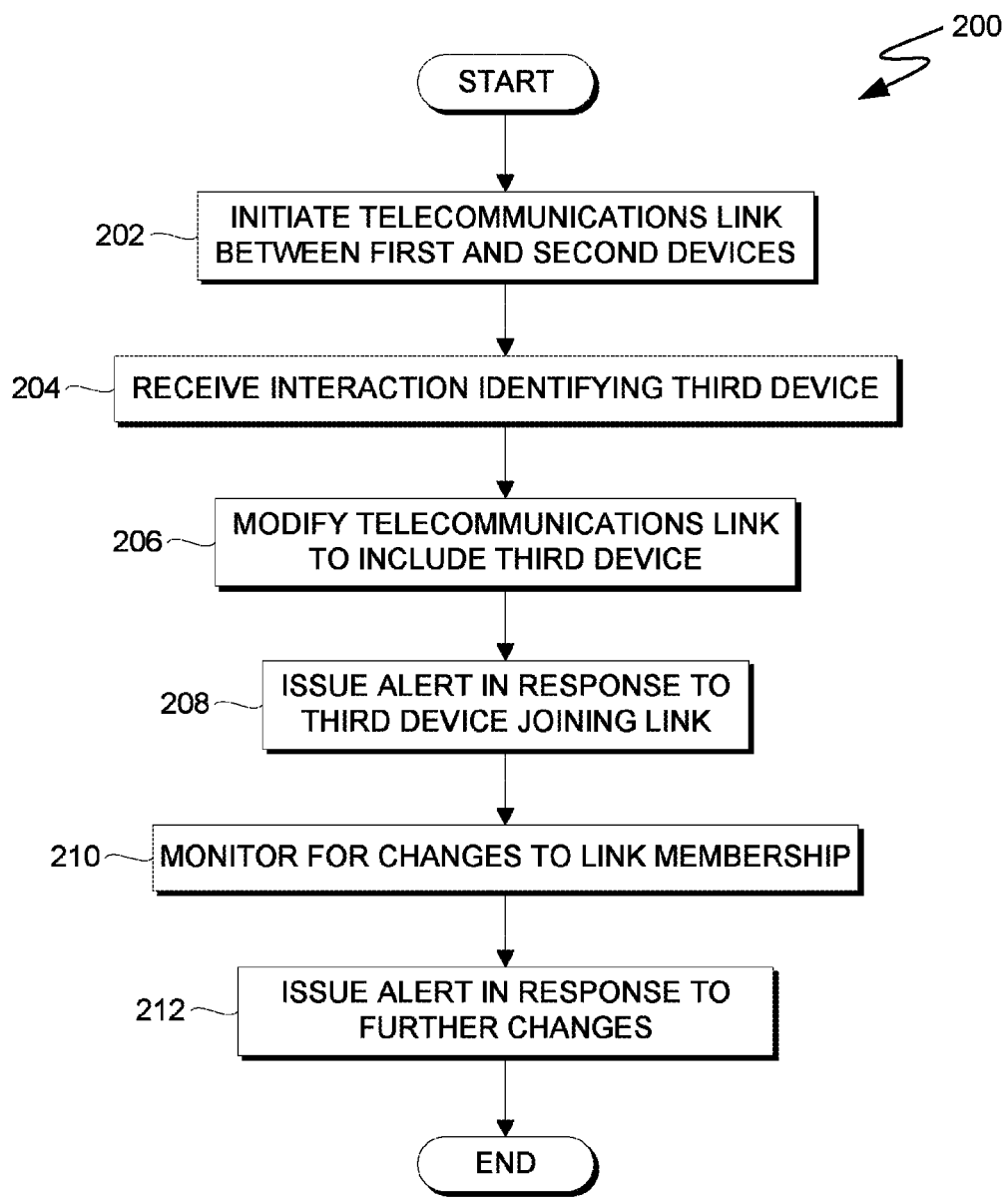
FIG. 2 is a flowchart depicting operations for issuing conference call alerts, on a computing device within the computing environment of FIG. 1, in accordance with an embodiment of the present invention.

FIG. 2 is a flowchart depicting operations for issuing conference call alerts, on a computing device within the computing environment of FIG. 1, in accordance with an embodiment of the present invention. For example, FIG. 2 is a flowchart depicting operations 200 of conference call program 104 on computing device 102 within computing environment 100.

In step 202, telecommunications device 102 initiates a telecommunications link between a first device and a second device. The telecommunications link enables voice communications between users of the first device and the second device. In one embodiment, conference call program 104 initiates the link in response to an interaction from a user of telecommunications device 102. In another embodiment, another function of telecommunications device 102 initiates the telecommunications link, in which case conference call program 104 detects that the link is initiated. In one example, the first device is telecommunications device 102 and the second device is telecommunications device 110.

In step 204, telecommunications device 102 receives an interaction identifying a third device. In one embodiment, conference call program 104 receives the interaction. In another embodiment, another function of telecommunications device 102 receives the interaction. The interaction identifies a communications address of the third device. For example, the communications address can be a telephone number, an internet protocol address, an email address, or another unique identifier of the third device. In one embodiment, in response to receiving the interaction identifying the third device, telecommunications device 102 initiates a second telecommunications link with the third device. For example, telecommunications device 102 receives an interaction to place the second device on hold and a subsequent interaction to initiate a second telecommunications link with the third device. In one example, the third device is telecommunications device 112.

In step 206, telecommunications device 102 modifies the telecommunications link to include the third device. In one embodiment, telecommunications device 102 merges the telecommunications link between the first device and the third device with that between the first device and the second device. The merged telecommunications link enables voice communications between users of the first device, second device, and third device. In another embodiment, the first device joins the third device directly to the telecommunications link between the first caller and the second caller rather than merging telecommunications links. In one example, conference call program 104, or another function of telecommunications device 102, modifies a telecommunications link between telecommunications device 102 and telecommunications device 110 to include telecommunications device 112.

In step 208, conference call program 104 issues an alert in response to the third device joining the telecommunications link. The alert is a notification (e.g., an SMS message, a voice message) transmitted via one or more communications protocols. For example, a first device (e.g., telecommunications device 102) establishes a telecommunications link with a second device (e.g., telecommunications device 110). In response to a third device (e.g., telecommunications device 112) joining the telecommunications link, the first device issues an alert to the second device and the third device. In this case, the alert is one or both of an SMS message and a voice announcement transmitted over the telecommunications link between the first device, second device, and third device. The alert includes information regarding the third device. In one embodiment, information identifies that a caller has joined the telecommunications link. For example, the alert identifies that a caller has joined without identifying the caller. Alternatively, the alert does identify the caller. In another embodiment, the alert identifies a communications address of the third device (e.g., a communications address received in step 204). In yet another embodiment, the alert provides an indication that the first device provided the interaction identifying the third device. For example, the alert identifies the first device as requesting the third device to join the telecommunications link. In another example, the alert identifies a name of a user of the third device, a communications address of the third device (e.g., a phone number), and an indication that the interaction (see step 204) was received from the first device. The name of a user of the third device may be provided by a user (e.g., of the first device or the third device) or a contacts database (e.g., of the first device or the third device).

In step 210, conference call program 104 monitors for further changes to membership of the telecommunications link. In one embodiment, conference call program 104 receives a notification from a carrier or telecommunications service provider identifying further changes. In another embodiment, conference call program 104 monitors for indicators that may be received from a device on the link. For example, conference call program 104 may receive an indicator from a device on the link that indicates that the device is departing the link. In one example, such an indicator may be an in-band telecommunication signal complying with a format such as dual-tone multi-frequency signaling. In yet another embodiment, conference call program 104 may receive indicators via out-of-band signaling, such as via an SMS message or data communication from another device of the link.

In step 212, conference call program 104 issues an alert in response to further changes. In one embodiment, conference call program 104 issues an alert in response to detecting that another device has joined the link. For example, conference call program 104 issues an alert in a substantially similar manner to that previously discussed in connection with step 208. In another embodiment, conference call program 104 issues an alert in response to a device leaving the link. For example, conference call program 104 receives an interaction from a user of the first device to remove the third device from the call. In this case, conference call program 104 issues an alert to one or more devices in response to the departing device leaving the link. In one embodiment, conference call program 104 determines that a device has left the link based on an indication received from the departing device or from a service provider through which the link is maintained.

FIGS. 3A-3D are functional block diagrams illustrating an example implementation of operations for issuing conference call alerts, in accordance with an embodiment of the present invention.

In FIGS. 3A-3D, user A is a user of a first device, user B is a user of a second device, and user C is a user of a third device. Each of the first device, second device, and the third device are telecommunications devices. In these figures, users A, B, and C perform actions via their respective devices.

Figure 3A:
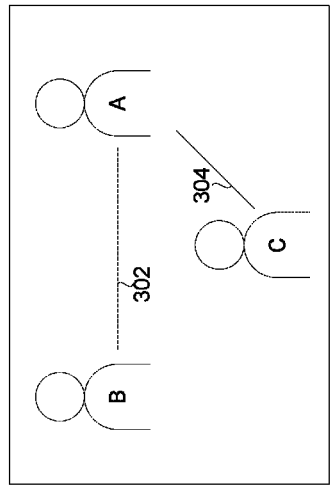
FIGS. 3A-3D are functional block diagrams illustrating an example implementation of operations for issuing conference call alerts, in accordance with an embodiment of the present invention.
Figure 3B:
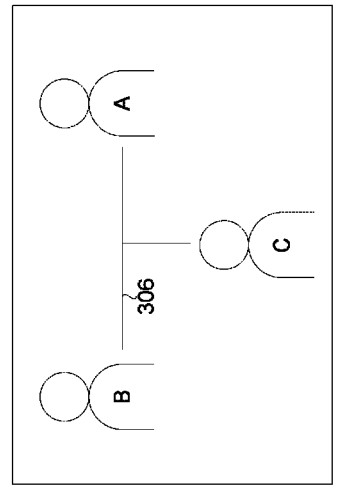

In FIG. 3A, user A initiates telecommunications link 302 with user B (see step 202). User A interacts with the first device to identify the third device of user C (see step 204). In FIG. 3B, user A initiates a second telecommunications link 304 with user C.

Figure 3C:
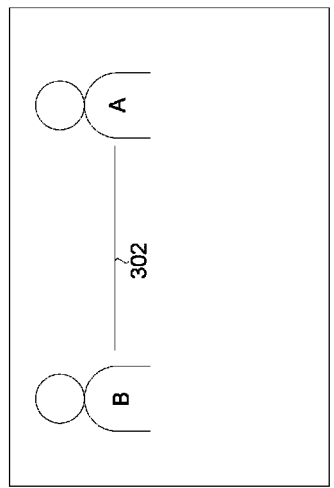
Figure 3D:
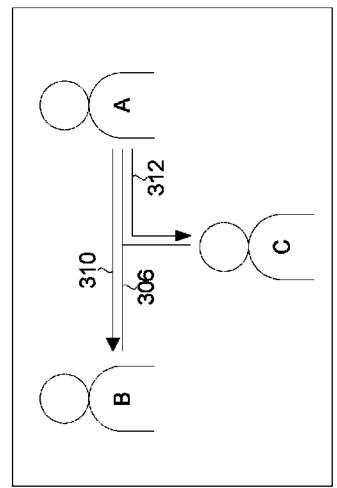

In FIG. 3C, telecommunications link 302 is modified to include the first device of user A, the second device of user B, and the third device of user C, thereby forming telecommunications link 306 (see step 206). The third device of user C thereby joins the telecommunications link between user A and user B. In response to the third device of user C joining the telecommunications link, the first device of user A issues alert 310 to the second device of user B and alert 312 to the third device of user C (see step 208). In FIG. 3D, the first device of user A monitors for additional changes to the membership of telecommunications link 306 (see step 210).

Figure 4:
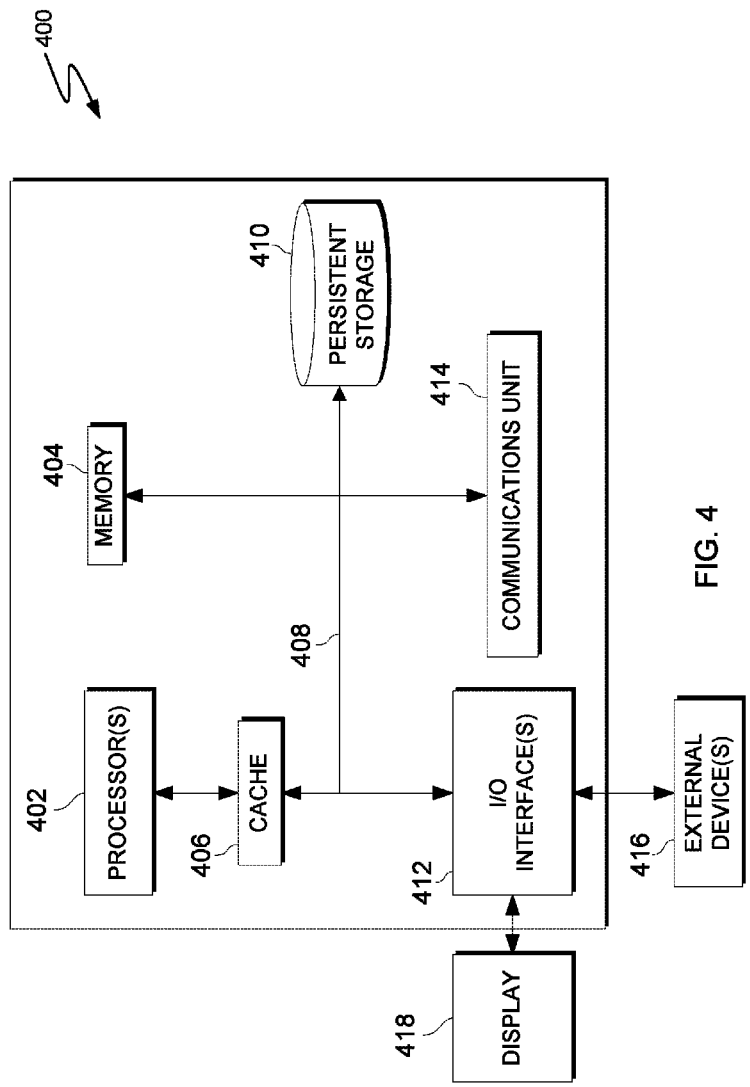
FIG. 4 is a block diagram of components of a computing device executing operations for issuing conference call alerts, in accordance with an embodiment of the present invention.

FIG. 4 is a block diagram of components of a computing device, generally designated 400, in accordance with an embodiment of the present invention. In one embodiment, computing device 400 is representative of telecommunications device 102 within computing environment 100, in which case telecommunications device 102 includes conference call program 104.

It should be appreciated that FIG. 4 provides only an illustration of one implementation and does not imply any limitations with regard to the environments in which different embodiments may be implemented. Many modifications to the depicted environment may be made.

Computer system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to each computer system. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for conference call alerts, the method comprising:

initiating, by a first device of a plurality of telecommunications devices, a telecommunications link between the first device and a second device of the plurality of telecommunications devices, wherein each device of the plurality of telecommunications device is a telephone, and wherein the telecommunications link transmits voice communications;

receiving, by the first device, an interaction that includes a communications address of a third device of the plurality of telecommunications devices;

modifying the telecommunications link to include the third device;

in response to the third device joining the telecommunications link, causing the first device to issue a first alert to the second device and the third device, wherein the first alert indicates that the third device has joined the telecommunications link, and wherein the first alert provides (i) a name of a user of the third device, wherein the name of the user is provided by a user or a contacts database of the first device or third device (ii) the communications address of the third device, and (iii) an indication that a user of the first device requested a user of the third device to join the telecommunications link;

in response to a departing device leaving the telecommunications link, causing the first device to issue a second alert or a third alert that indicates that the departing device has left the telecommunications link;

wherein the second alert is issued to the third device and the second device when the departing device is the second device, and wherein the third alert is issued to the second device and third device when the departing device is the third device;

wherein the second alert and the third alert provides (i) a name of a user of the departing device and (ii) an indication that the user of the departing device has left the telecommunications link, wherein the second alert comprises a second short message service (SMS) message to the second device and the third device and a second voice announcement over the telecommunication link to the third device only and wherein the third alert comprises a third SMS message to the third device and the second device, and a third voice announcement over the telecommunication link to the second device only;

wherein issuing the first alert further comprises:

issuing a first short message service (SMS) message that includes the first alert to the second device, and the third device; and issuing a first voice announcement to the second device, and the third device via the telecommunications link.

* * * * *